(12) United States Patent
Johnson et al.

(10) Patent No.: US 8,881,294 B2
(45) Date of Patent: Nov. 4, 2014

(54) METHODS AND SYSTEMS FOR SECURELY UPLOADING FILES ONTO AIRCRAFT

(75) Inventors: Daniel P. Johnson, Fridley, MN (US); Joseph Nutaro, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 502 days.

(21) Appl. No.: 13/030,292

(22) Filed: Feb. 18, 2011

(65) Prior Publication Data

US 2012/0216286 A1    Aug. 23, 2012

(51) Int. Cl.
| | |
|---|---|
| *G06F 21/64* | (2013.01) |
| *H04L 29/06* | (2006.01) |
| *H04L 29/08* | (2006.01) |
| *G06F 9/445* | (2006.01) |

(52) U.S. Cl.
CPC ............... *G06F 21/64* (2013.01); *G06F 9/445* (2013.01); *H04L 63/123* (2013.01); *H04L 67/12* (2013.01)
USPC .......................................................... 726/26

(58) Field of Classification Search
CPC .................................. G06F 21/20; H04L 9/00
USPC .......................................................... 726/26
See application file for complete search history.

(56) References Cited

U.S. PATENT DOCUMENTS

| | | | |
|---|---|---|---|
| 5,694,569 A | 12/1997 | Fischer | |
| 6,047,165 A | 4/2000 | Wright | |
| 6,438,468 B1 | 8/2002 | Muxlow et al. | |
| 7,086,089 B2 * | 8/2006 | Hrastar et al. | 726/22 |
| 7,386,878 B2 * | 6/2008 | Fernando et al. | 726/3 |
| 2005/0267860 A1 | 12/2005 | Benguigui | |
| 2007/0027589 A1 * | 2/2007 | Brinkley et al. | 701/3 |
| 2009/0138385 A1 * | 5/2009 | Harnish et al. | 705/28 |
| 2009/0198393 A1 * | 8/2009 | Sims et al. | 701/3 |

FOREIGN PATENT DOCUMENTS

| | | | | |
|---|---|---|---|---|
| EP | 0112944 | * | 12/1982 | G07F 7/10 |

OTHER PUBLICATIONS

Menezes A J, Handbook of Cryptography, Aug. 1996, 5th Edition, Chapter 9, 64 pages.*
Menezes A J, Handbook of Cryptography, Aug. 1996, 5th Edition, Chapter 11, 65 pages.*
Schmidt T, CRC Generating and Checking, AN730 Device Data Sheet, 2000, pp. 1-24.*
Menezes, Handbook of Applied Cryptography, CRC Press, 1996. Chapter 11, pp. 425 and 445-447. Chapter 9, p. 322.*
European Patent Office, "European Search Report", mailed Jun. 11, 2012, Published in: EP.
Menezes et al., "Chapter 11: Digital Signatures ", Oct. 1, 1996, pp. 165, Publisher: CRC Press, Inc.
European Patent Office, "Office Action", Aug. 10, 2010, Published in: EP.

* cited by examiner

*Primary Examiner* — Vivek Srivastava
*Assistant Examiner* — Gary Dennis
(74) *Attorney, Agent, or Firm* — Fogg & Powers LLC (57) ABSTRACT

Methods and systems for securely uploading files onto a vehicle such as an aircraft are provided. In one embodiment, a system for transmitting files to a remote vehicle comprises: a communication system onboard the remote vehicle; at least one processor onboard the remote vehicle coupled to the communication system; and at least one storage device comprising a database, the at least one storage device further comprising computer executable instructions which when executed by the at least one processor implement a data checking functionality process comprising: generating a security file at the remote vehicle from an uplinked file received by a communication system; verifying integrity of the uplinked file using the security file; when integrity of the uplinked file is confirmed, accepting the uplinked file; and when integrity of the uplinked file is not confirmed, rejecting the uplinked file.

15 Claims, 5 Drawing Sheets

METHODS AND SYSTEMS FOR SECURELY UPLOADING FILES ONTO AIRCRAFT

BACKGROUND

Aircraft operators and owners are increasingly taking advantage of existing and emerging wireless and internet based connections to remotely upload data to aircraft. Such data is loaded into an avionics system of an aircraft at various times throughout the lifetime of the aircraft and often must be secure. Uploading files remotely exposes the aircraft to the possibility of downloading the malicious data an attacker uploaded in place of the correct data. High assurance software can detect some malicious data; however, this software is typically costly.

Typically, a database file is uploaded along with its checksum to the aircraft. The onboard system computes a second checksum of the database and compares it to the uploaded checksum. A disparity between the two checksums may indicate noise or that an error has occurred. However, this system and method is open to potential attack. For example, an attacker can attempt to change the database file and provide a corresponding checksum or change the database in a way that does not alter the original checksum. In such cases, when the onboard system receives the changed database file and its corresponding checksum, the onboard system has no way of detecting that the database file is altered. Therefore, current methods of uploading files onto an aircraft are unable to detect some forms of tampering or corruption.

For the reasons stated above and for other reasons stated below which will become apparent to those skilled in the art upon reading and understanding the specification, there is a need in the art for systems and methods that provide secure uploading of data onboard an aircraft.

SUMMARY

The Embodiments of the present invention provide methods and systems for type and range propagation through data flow models and will be understood by reading and studying the following specification.

Methods and systems for securely uploading files onto a vehicle such as an aircraft are provided. In one embodiment, a system for transmitting files to a remote vehicle comprises: a communication system onboard the remote vehicle; at least one processor onboard the remote vehicle coupled to the communication system; and at least one storage device comprising a database, the at least one storage device further comprising computer executable instructions which when executed by the at least one processor implement a data checking functionality process comprising: generating a security file at the remote vehicle from an uplinked file received by a communication system; verifying integrity of the uplinked file using the security file; when integrity of the uplinked file is confirmed, accepting the uplinked file; and when integrity of the uplinked file is not confirmed, rejecting the uplinked file.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Some embodiments described herein provide systems and methods for securely uploading files remotely through systems subject to external attack, such as through a wireless connection or over the internet. These embodiments ensure that the uploaded file is a valid copy of or a related file to the originating file. This is achieved through validating the integrity of the uploaded file. In some embodiments, the integrity of an uploaded file is validated through the use of one or more remote integrity checking websites, a line replaceable unit (LRU), or a high-assurance onboard system.

Figure 1:
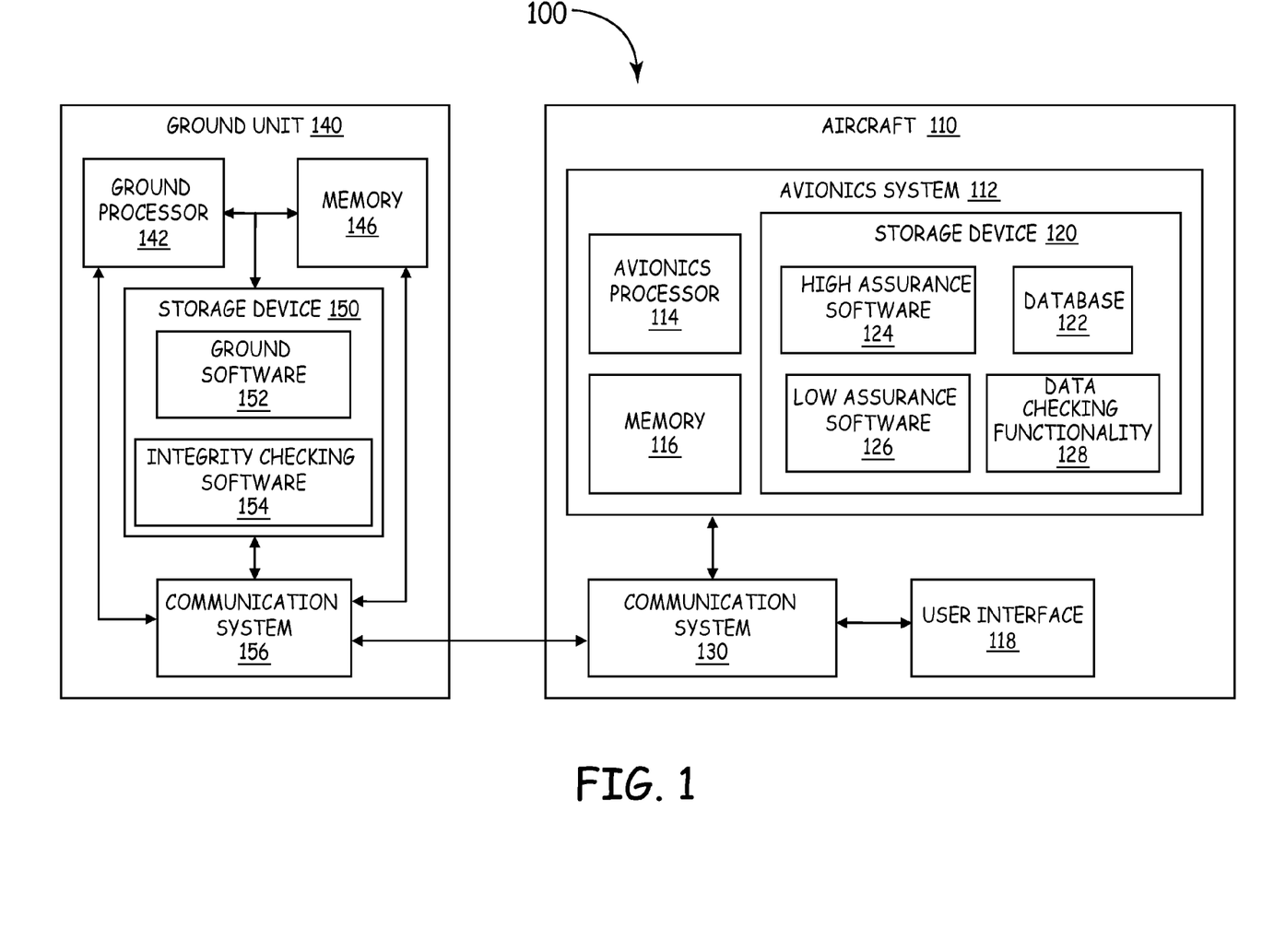
FIG. 1 is a block diagram of a system for securely uploading files onto an aircraft according to one embodiment of the present invention.

FIG. 1 is a block diagram of a system 100 for securely uploading files onto an aircraft 110 according to one embodiment of the present invention. As used herein, the term "aircraft" refers to any aerial vehicle such as, but not limited to, an airplane, helicopter, or other flying vehicle. Ground unit 140 comprises a device or system having processing and communication abilities and is remotely located from the aircraft 110. In other words, the ground unit 140 is not a system installed onboard the aircraft 110.

Aircraft 110 comprises an avionics system 112 communicatively coupled to a communication system 130. Avionics system 112 comprises an avionics processor 114, a memory 116, and at least one data storage device 120 for storing computer executable application instructions and data used by such computer executable applications. In particular, storage device 120 includes a database 122 that stores information related to, among other things, flight information and aircraft specifications, including, for example, flight plans, navigation information and aircraft parameters such as the current weight of aircraft 110. Storage device 120 also stores high assurance software 124 and low assurance software 126 (collectively referred to herein as "software 124 and 126") that comprise computer executable program instructions. As illustrated in FIG. 1, storage device 120 further comprises executable code for data checking functionality 128, which may be implemented as part of either high assurance software 124, low assurance software 126, or both.

The avionics processor 114 executes the high assurance software 124 and low assurance software 126 that causes the avionics processor 114 to perform the processing described herein as being performed by avionics system 112 to facilitate securely uplinking files from ground unit 140 to the avionics system 112.

As would be appreciated by one of ordinary skill in the art upon reading this specification, software used in avionics applications is subject to government regulations relating to the safety and reliability of that software. A typical means for indicating how a particular piece of avionics software is compliant with those regulations is to have certification levels detailing the reliability of the software. As such, high assurance software 124 has a higher certification level than the low assurance software 126. As the term is used herein, a certification level indicates the level of quality assurance applied in designing, verifying and validating the software to ensure that the software will perform with the expected level of reliability. For example, certification levels are often used to identify software that meets airworthiness requirements.

For some embodiments described herein, the standard DO-178B "Software Considerations in Airborne Systems and Equipment Certification" published by Radio Technical Commission for Aeronautics (RTCA), Inc. is used designate the certification levels of software 125 and 126. DO-178B defines five software Design Assurance Levels (DALs), starting at the highest Level A (most reliable) through the lowest Level E (least reliable). Each level is defined by the effects of a failure condition resulting from anomalous software behavior has on the aircraft, crew, and passengers. For example, a failure of software designated Level A software is catastrophic (failure may cause a crash), Level B is hazardous (large negative impact on safety or performance), Level C is major (failure is significant but has lesser impact than a Level B failure), Level D is minor (failure is noticeable), and Level E has no effect (failure has no impact on safety, aircraft operation, or crew workload). Typically, high assurance level software is costlier in terms of design and production than lower assurance level software due to the extra time taken in documenting, constructing, and testing the code. Although these avionics certification levels are oriented towards avionics, they also provide a set of convenient criteria and goals for the development of other systems. Such criteria can apply to any system whether or not formal certification, such as from government agencies, is required.

In at least one implementation of the embodiment shown in FIG. 1, high assurance software 124 comprises software with certification Levels from A to C while low assurance software 126 comprises certification Levels D and E. Typically, high assurance software 124 is used for more critical flight control systems than the low assurance software 126. The low assurance software 126 is used for maintenance functions, including for example, uploading files for storage in database 122. Either, high assurance software 124 or low assurance software may potentially uses information stored in the database 122. As discussed in greater detail below, data checking functionality 128 functions to validate the integrity of files uplinked from ground unit 140 prior to loading those files into database 122.

Standard DO-178B is provided for example purposes only. That is, for other embodiments, other standards and/or certification levels are used. In yet other embodiments of the system 100, the software 124 and 126 in the avionics system 112 need not be explicitly certified to meet specific certification levels, or alternatively may be certified to the same certification level. For example, all software applications for avionics system 112 could theoretically be certified to DO-178B Level A, but still be segregated between software 124 and 126 based on the criticality of the functions they perform. As would be appreciated by one of ordinary skill in the art upon reading this specification, avionics system 112 may further comprise additional software beyond software 124 and 126 that has differing certification levels.

In some embodiments, a hardware partitioning separates high assurance software 124 from low assurance software 126. In one such embodiment, avionics processor 114 actually comprises two separate processing devices (for example, two different microprocessors), where a first processing devices runs the high assurance software 124 and a second processing devices runs the low assurance software 126. One implementation of the avionics system 112 comprises an Integrated Modular Avionics (IMA), which is a computing network capable of supporting numerous applications of differing criticality levels.

As illustrated in FIG. 1, avionics system 112 further comprises a user interface 118 and a communication system 130. The user interface 118 provides functionality to a user (such as a pilot or crew member) to interact with the avionics system 112. In one embodiment, the user interface 118 is a human machine interface (HMI) that includes a set of screens used for receiving files uplinked from the ground unit 140, verifying the integrity of the received file, and either rejecting the received file or storing it in the database 122. In other embodiments, the avionics system 112 performs the methods described herein without user input.

Communication system 130 comprises wireless communication devices such a radio frequency (RF) transceiver operating in one or more frequency bands such as, for example, high frequency (HF) very high frequency (VHF), or ultra high frequency (UHF), or using cellular phone technology. Communication system 130 may optionally include other IP-based communication technology for use with internet data links (such as, but not limited to Wi-Fi) and may include a physical Ethernet protocol interface for direct wired connections. In addition communication system 130 may be utilized on aircraft 110 for aircraft data link communication systems such as, but not limited to, the aeronautical telecommunications network (ATN), future air navigation system (FANS), and Aircraft Communications Addressing and Reporting System (ACARS).

Ground unit 140 comprises a processor 142, memory 146, and a storage device 150 that includes ground software 152 and Integrity Checking Software 154, and a communication system 156, any of which may be implemented similarly to their counterpart elements in aircraft 110. Ground software 152 includes functionality to facilitate the uplink of a file, such as a database file, to the aircraft 110. Ground software 152 includes computer executable instructions which when executed by processor 142 perform the functions attributed to ground units discussed below. Such functions may include obtaining and/or generating database files, hosting or accessing one or more websites, deriving security files, initiating file transfers and validating file transfers. These functions are described with more specificity below. The aircraft 110 and the ground unit 140 communicate to each other through communication systems 130 and 156, respectively.

Figure 2:
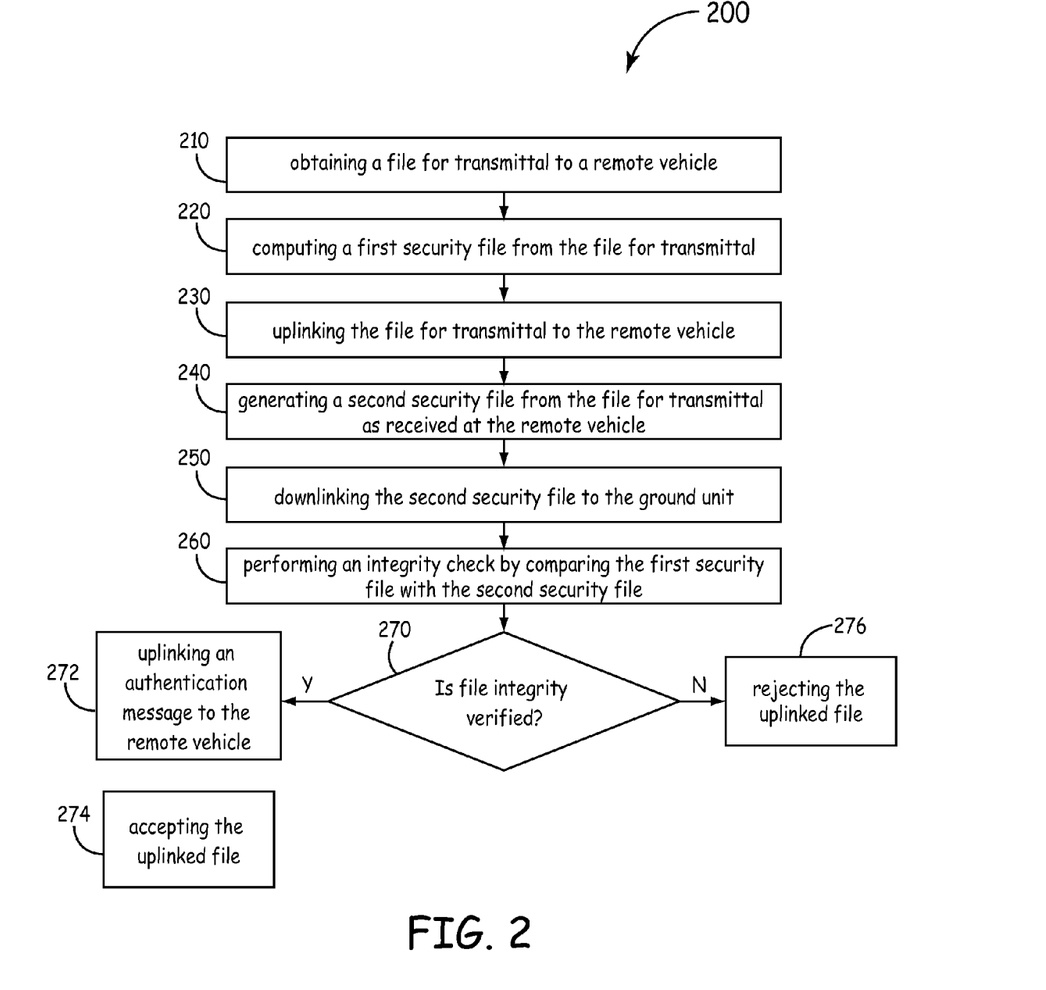
FIG. 2 is a flowchart of a method for securely uploading files onto a remote vehicle according to one embodiment of the invention.

FIG. 2 is a flowchart illustrating a method 200 for securely uploading files onto a remote vehicle according to one embodiment of the invention. In one implementation of the method, the ground unit comprises ground unit 140 discussed above, and the remote vehicle comprises the avionics system 112 of aircraft 110. In one embodiment, the ground unit hosts an integrity checking website and a database website. The integrity checking website includes functionality for confirming the authenticity of files uploaded to the remote vehicle through validating the integrity of the file. The database website includes functionality for generating, building, or otherwise obtaining the files that are to be uploaded to the remote vehicle. In some embodiments, the functionality provided by the integrity checking website and a database website are distributed over multiple physical devices and may include redundant systems to increase reliability under adverse conditions, such as when an attack to corrupt systems on the remote vehicle is attempted.

The method begins at 210 with obtaining a file for transmittal to the remote vehicle. In one embodiment, the file for transmittal is generated by the ground unit. In other embodiments, the file for transmittal is received by the ground unit from an external source, such as via a secured network connection, or locally loaded such as via a disc. In one embodiment, the file for transmittal comprises a database file for uploading onto database 122 of aircraft 110.

The method proceeds to 220 with computing a first security file from the file for transmittal. In one embodiment, the ground unit, using the integrity checking website, computes a first ground security file from the file. As the term is used herein, a "security file" comprises a file or code that is used for validating whether a transferred file is related to or a copy of the original file. Examples of a security file include a hash code computed with a hash function, an encrypted passcode, a shared secret key, a checksum or cyclic redundancy check (CRC), a signature, a Message Authentication Code (MAC), or the like. In one embodiment, a hash code is computed using a standard hash function from the National Institute of Standards and Technology (NIST).

The method proceeds to 230 with uplinking the file for transmittal to the remote vehicle. As used herein, the term "uplinking" refers to transmittal from the ground unit to the remote vehicle while "downlinking" refers to transmittal from the remote vehicle to the ground unit. In one embodiment, uplinking is performed via a wireless communication link. In other embodiments, such as where aircraft 110 has landed, the uplinking may be performed via a wired connection between the ground unit and remote vehicle. At this point, the remote vehicle has received the file from the ground unit, but because the file has not been verified, the remote vehicle does not yet utilize the information in the file. In one embodiment, the file is temporarily stored in a memory, but not yet loaded into permanent storage, until the verification described below is complete.

The method proceeds to 240 with generating a second security file from the file for transmittal as received at the remote vehicle and to 250 with downlinking the second security file to the ground unit.

The method then proceeds to 260 performing an integrity check by comparing the first security file with the second security file. In one embodiment, the integrity check is performed via the remote integrity checking website. In one embodiment, the integrity check verifies whether the first and second security files match, or otherwise correlate as expected. When the integrity of the file received at the remote vehicle is verified (confirmed at block 270), the method proceeds to 272 with uplinking an authentication message to the remote vehicle. As used herein, an authentication message is any message that indicates the received file was validated as a copy of the original file.

In one embodiment, the authentication message includes an encrypted passcode. The remote vehicle would decrypt the passcode using, for example, a shared secret key, to determine whether the received file is valid. In another embodiment, the authentication message is a database letter ("db letter") such as those used for aircraft certification. The db letter indicates that the correct file has been uploaded and acts as a 'bill of lading' or 'permission to go ahead' for the remote vehicle to load the file. In such an embodiment, the remote vehicle and the ground unit do not need to share secret keys or compute or check hashes. When the authentication message is received at the remote vehicle, the method proceeds to 274, with accepting the uplinked file. That is, the remote vehicle loads the file to storage device 120 and/or database 122.

When the integrity of the file received at the remote vehicle fails verification (as confirmed at block 270), the process proceeds to 276 with rejecting the uplinked file for storage on the at least one storage device. That is, the remote vehicle does not load the file for use by the remote vehicle. In one embodiment, when this occurs, the file is discarded by the remote vehicle. In one embodiment, the remote vehicle assumes that verification has failed based on an expiration of a time-out period during which an authentication message has not been received. In another embodiment, the method provides for uplinking a message to the remote vehicle indicating that the file is invalid. In this way, the method permits the ground unit to monitor data loading events on an aircraft through analysis of the received security file. If the security file is incorrect, there is a possibility that the avionics system is having an error. In such a situation, the ground unit can send an indicator to the remote vehicle or a user informing the system or user of the error. In addition, reception of a unexpected security file from the remote vehicle can indicate when an authorized attempt to load a file onto the remote vehicle has been attempted.

Figure 3:
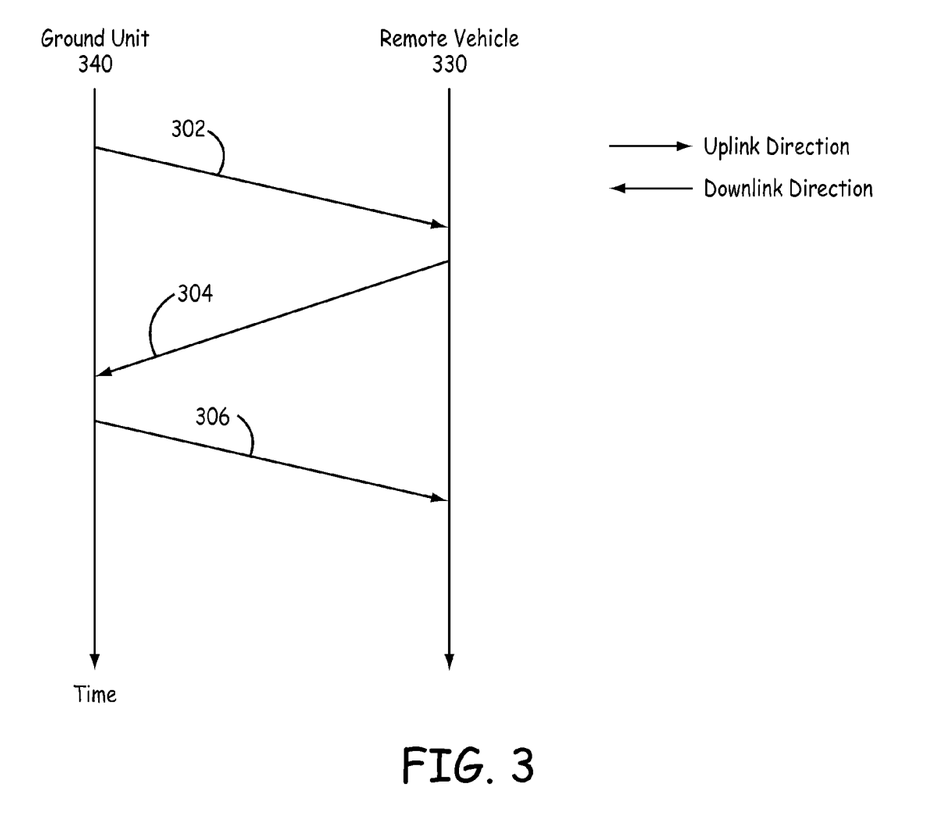
FIG. 3 shows an exemplary flow diagram of downlink and uplink messages according to the method of FIG. 2.

FIG. 3 illustrates a flow diagram 300 illustrating the communication of uplink and downlink such as those that occur according to method 200 of FIG. 2. As described above, in one embodiment, the ground unit has access to an integrity checking website and a database website. The database website generates a database file that is to be loaded on the remote vehicle. In some embodiments, the database file, one generated by the database website transferred to the integrity checking website and from there it is transmitted to the remote vehicle. In one such embodiment, the remote vehicle links to the integrity checking website in order to initiate uplinking of the file. In other embodiments, the ground unit wirelessly transmits the database file directly to the remote vehicle.

As illustrated in FIG. 3, an uplink transmission 302 originates from the ground unit 340 (which in one embodiment comprises ground unit 140) and is transmitted to the remote vehicle 330 (which is one embodiment comprises avionics system 112 on aircraft 110). A first security file is generated at the ground unit 340 from the contents of the uplink transmission. Upon reception of uplink transmission 302, a data checking functionality (such as 128) at remote vehicle 330 generates a second security file from the uplinked file and sends the second security file to ground unit 340 as downlink transmission 304.

The integrity checking website receives the second security file and compares it to the first security file. If the files correspond as expected, the uploaded file is validated and the ground unit 340 transmits an authentication message to the remote vehicle 330 via uplink transmission 306. In one embodiment, the authentication message provides the aircraft 110 with instructions to store the uplinked based on the comparison of the first and second security files. Alternately, uplink transmission 306 may instead indicate that the file failed integrity validation, in which case remote vehicle 330 discards the file it received via uplink transmission 302. In one embodiment, when remote vehicle 330 fails to receive an authentication message within a predetermined time period of transmitting the second security file, it presumes that the file received via uplink transmission 302 was invalid and discards the file. In one embodiment, uplink transmission 306 can optionally be transmitted by an alternate communications channel.

Figure 4:
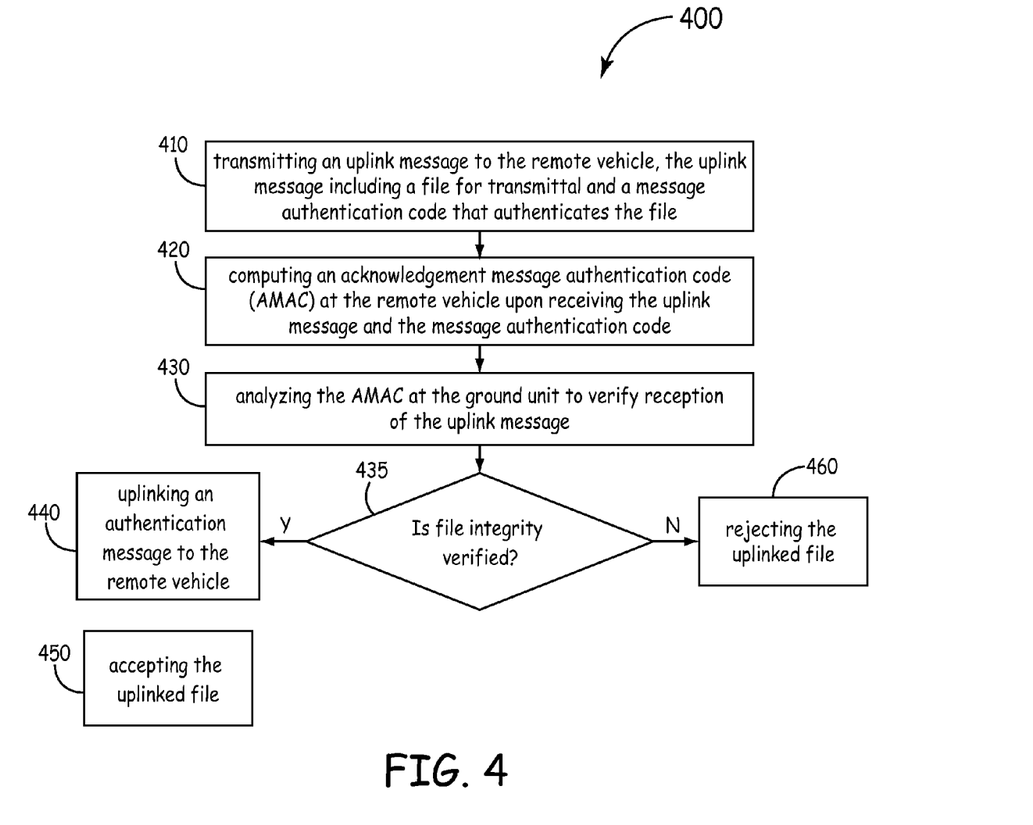
FIG. 4 is a flowchart of a method for validating an uplinked file using a Message Authentication Code (MAC) according to one embodiment of the invention.

FIG. 4 is a flowchart illustrating a method 400 of one embodiment of the present invention. Method 400 is drawn to validating an uplinked file using a Message Authentication Code (MAC). As used herein, a message authentication code, or MAC, is defined as a keyed hash function derived value that incorporates a shared secret key. The message authentication code protects both a message's data integrity and authenticity, by allowing receives that possess the shared secret key to detect any changes to the message content. Further, without the shared secret key, it is not possible to forge a valid message authentication code for a message. As with the method described in FIG. 2, in one implementation of the method of FIG. 4, the ground unit comprises ground unit 140, and the remote vehicle comprises the avionics system 112 on aircraft 110.

The method begins at 410 with transmitting an uplink message to the remote vehicle, the uplink message including a file for transmittal and a message authentication code that authenticates the file. In one embodiment, the ground unit hosts an integrity checking website and a database website. In that case, the integrity checking website includes functionality for generating the message authentication code for the file for transmittal. The database website includes functionality for generating, building, or otherwise obtaining the files that are to be uploaded to the remote vehicle.

The method proceeds to 420, with computing an acknowledgement message authentication code (AMAC) at the remote vehicle upon receiving the uplink message and the message authentication code. That is, the remote vehicle generates an acknowledgement message that is itself authenticated using a keyed hash function derived value appended to the acknowledgement message. In one embodiment, the shared secret key used with the keyed hash function with the uplink message in block 410 is the same shared secret key used to generated the AMAC. In other embodiments, different shared secret keys are used at blocks 410 and 420.

In one embodiment, block 420 is performed by data checking functionality 128 as illustrated in FIG. 1. In different implementations of such an embodiment, the MAC for the uplinked message and the AMAC can be processed in avionics system 112 by either the High Assurance Software 124 or Low Assurance Software 126. In one implementation, High Assurance Software 124 is used to double check some or all of the functions performed by Low Assurance Software 126.

The method proceeds to 430, with analyzing the AMAC at the ground unit to verify integrity of the reception of the uplink message. In one embodiment, the AMAC is analyzed by the integrity checking website to confirm that the AMAC corresponds to the uplinked message, indicates that the file carried by the uplink message was correctly received at the remote vehicle, and that the AMAC itself has not otherwise been altered. When analyzing the AMAC confirms integrity of the reception of the uplink message (checked at 435), the method proceeds to 440 with transmitting (uplinking) an authentication message to the remote vehicle. As described above, in alternate embodiments, the authentication message may include an encrypted passcode, database letter. When the authentication message is received at the remote vehicle, the method proceeds to 450, with accepting the uplinked file by loading the file to the storage device at the remote vehicle. In one embodiment, uplinking the authentication message at 440 can optionally be accomplished by an alternate communications channel.

When analyzing the AMAC fails to confirms a successful transmission of the uplink message (as confirmed at block 435), the process proceeds to 460 with rejecting the uplinked file wherein the remote vehicle does not accept the file for loading into the storage device. In one embodiment, when this occurs, the file is discarded by the remote vehicle. In one embodiment, the remote vehicle assumes that verification has failed based on an expiration of a time-out period during which an authentication message has not been received. In another embodiment, the method provides for uplinking a message to the remote vehicle indicating that the file is invalid. In this way, the method permits the ground unit to monitor data loading events on an aircraft through analysis of the received security file.

In yet another embodiment, the aircraft includes a line replaceable unit (LRU) coupled to or within the avionics system. The LRU is preloaded with a shared secret key for use with the ground station. Using this shared secret key, the LRU calculates a MAC for the file in the uplinked message and compares it to MAC provided by the ground unit to confirm that the file is valid. When the file is valid, the LRU instructs the avionics system to load the file.

Figure 5:
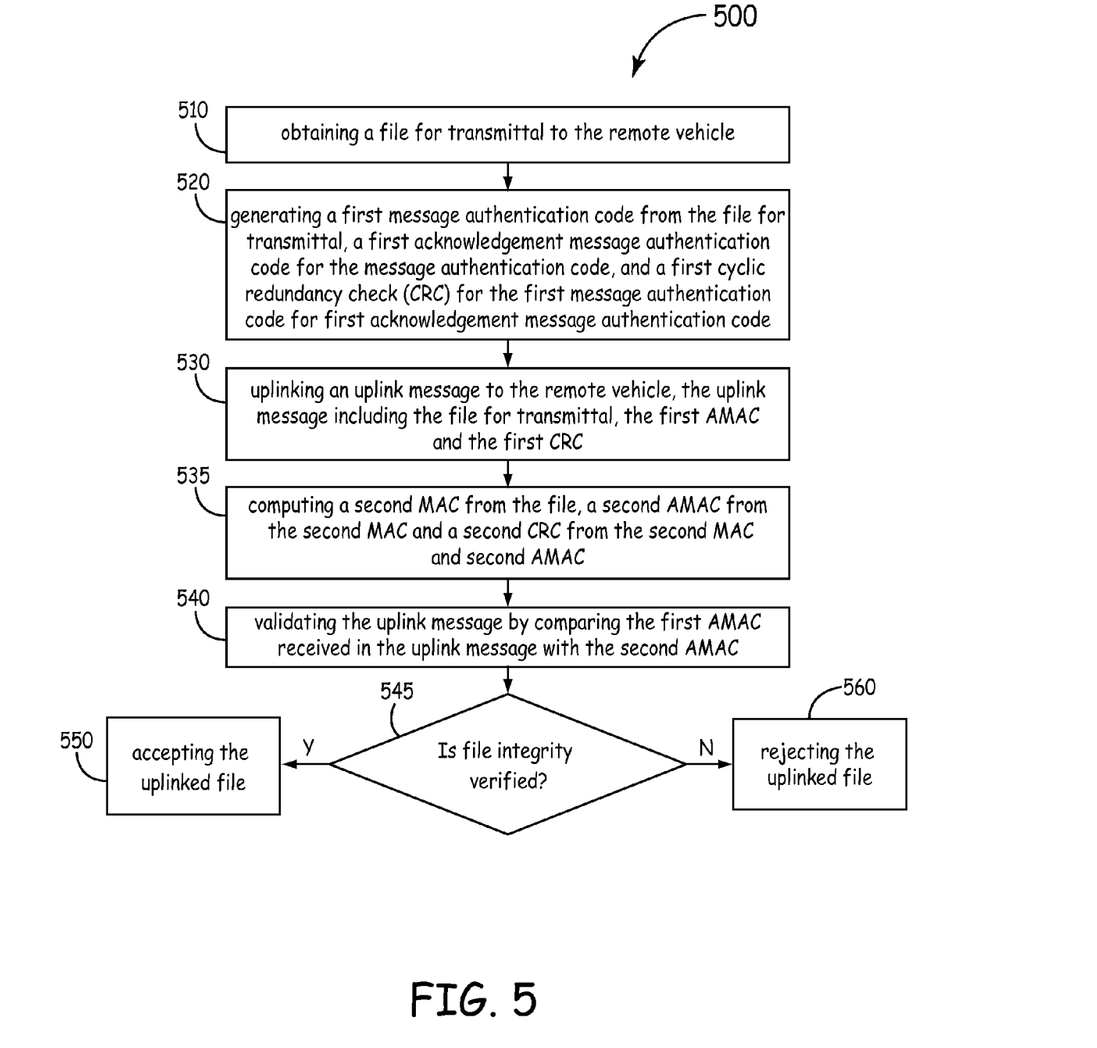
FIG. 5 is a flowchart of a method for validating a file uplinked from a ground unit to a remote vehicle according to another embodiment of the invention.

FIG. 5 is a flowchart illustrating yet another method 500 of one embodiment of the present invention. In one implementation of the method of FIG. 5, the ground unit comprises ground unit 140, and the remote vehicle comprises the avionics system 112 on aircraft 110. In this embodiment, the ground unit does not perform a validity confirmation. Instead, the ground unit and remote vehicle are both preloaded with a keyed hash function and passwords for computing message authentication codes.

The method begins at 510 with obtaining a file for transmittal to the remote vehicle. In one embodiment, the file for transmittal is generated by the ground unit. In one embodiment, the ground unit hosts an integrity checking website and a database website. In one such embodiment, the database website includes functionality for generating, building, or otherwise obtaining the files that are to be uploaded to the remote vehicle. In other embodiments, the file for transmittal is received by the ground unit from an external source, such as via a secured network connection, or locally loaded such as via a disc.

The method proceeds to 520 with generating a first message authentication code from the file for transmittal, a first acknowledgement message authentication code for the message authentication code, and a first cyclic redundancy check (CRC) for the first message authentication code and first acknowledgement message authentication code. That is, a CRC value is calculated based on both the first MAC and first AMAC together. In one embodiment, the functionality of block 520 is performed by at the ground unit by the integrity checking website.

The method proceeds to 530 with uplinking an uplink message to the remote vehicle, the uplink message including the file for transmittal, the first AMAC and the first CRC. Upon receiving the uplink message at the remote vehicle, method proceeds to 535 with the remote vehicle computing a second MAC from the file, a second AMAC from the second MAC and a second CRC from the second MAC and second AMAC. That is, a the second CRC value is calculated based on both the second MAC and second AMAC together.

The method proceeds to 540 with validating the uplink message by comparing the first AMAC received in the uplink message with the second AMAC. When validating the uplink message confirms a successful transmission of the uplink message (checked at 545), the method proceeds to 550 with accepting the uplinked file. When validating the uplink message fails to confirms a successful transmission of the uplink message (as confirmed at block 545), the method proceeds to 560 with rejecting the uplinked file. In one embodiment, rejecting the uplinked file comprises discarding the file. That is, the remote vehicle does not permanently load or otherwise utilize the file.

One specific advantage of the method of FIG. 5 is that the method can be performed without having bidirectional communications between the ground unit and the remote vehicle. That is, no downlinks are required to validate the integrity of the file provided in the uplinked message.

In one embodiment, high assurance software (for example, Level A) in the avionics system of the remote vehicle generates the second CRC and compares it to the first CRC while low assurance software (for example, Level D) generates the second MAC and AMAC. In this embodiment, the high assurance software checks to ensure that the second MAC and AMAC generated by low assurance software are correct.

In another embodiment, low assurance software in the avionics system of the remote vehicle checks the second AMAC against the first AMAC for validation. In such an embodiment, if there is a conflict between the two, the file is rejected at that point, and the file's data is not loaded. There is no need for the high assurance software to compare the CRCs.

In some embodiments of the methods provided in FIGS. 2-5 above, the uplink and downlink messages transmitted between the ground unit and remote are not encrypted. In other embodiments, some or all of the uplink and downlink messages are encrypted. Further, in some embodiments of the above methods, actions by low assurance systems or software are cross-checked by high assurance systems or software.

It is to be understood that embodiments of the invention apply to situations outside of avionics, including any transfer of a secured file from one device to another. For example, methods and systems described herein apply to any wired or wireless unit downloading a file. Embodiments described herein provide validation that the correct file has been uploaded by sending an authentication message to the onboard system that can only be checked by the onboard system if the onboard system has received the correct file and has correctly computed the signature of the uploaded file. Embodiments described herein also provide a way for a ground unit to monitor data loading events on an aircraft.

Several means are available to implement the systems and methods discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media for the memory and storage devices describe above include any form of a physical computer memory storage device. Examples of such a physical computer memory device include, but is not limited to, punch cards, firmware, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for transmitting files to a remote vehicle, the system comprising:
   a communication system onboard the remote vehicle;
   at least one processor onboard the remote vehicle coupled to the communication system; and
   at least one storage device comprising a database, the at least one storage device further comprising computer executable instructions which when executed by the at least one processor implement a data checking functionality process comprising:
      generating a security file at the remote vehicle from an uplinked file received by a communication system;
      downlinking the security file to a ground unit, wherein the ground unit performs an integrity check based on the security file;
      determining whether the integrity of the uplinked file is verified based on reception of an authentication message from the ground unit by the communication system, the authentication message indicating that the uplinked file was validated as a copy of an original file by the ground unit;
      when integrity of the uplinked file is confirmed, accepting the uplinked file; and
      when integrity of the uplinked file is not confirmed, rejecting the up linked file.

2. The method of claim 1, wherein the remote vehicle comprises an aircraft avionics system onboard an aircraft.

3. The system of claim 1, the ground unit comprising integrity checking software
   implementing a process comprising:
   computing a second security file from the uplinked file; and
   performing an integrity check by comparing the second security file with the security file downlinked from the aircraft.

4. The system of claim 1, the data checking functionality process further comprising:
   receiving a message authentication code for the uplinked file;
   wherein generating a security file from an uplinked file comprises computing an acknowledgement message authentication code at the remote vehicle upon receiving the uplinked file and the message authentication code.

5. The system of claim 4, wherein the message authentication code and the acknowledgement message authentication code are each generated using a keyed hash function.

6. The system of claim 4, where the data checking functionality process further comprises:
   downlinking the acknowledgement message authentication code to a ground unit; and determining whether the integrity of the uplinked file is verified based on reception of an authentication message from the ground unit by the communication system.

7. The system of claim 1, the data checking functionality process further comprising:
receiving a message authentication code for the uplinked file via the communication system;
wherein generating a security file from the uplinked file comprises calculating a second message authentication code for the uplinked file at the remote vehicle; and
wherein verifying integrity of the uplinked file using the security file comprises performing an integrity check by comparing the second message authentication code with the message authentication code received via the communication system.

8. The system of claim 1, wherein the security file is computed using at least one of
a hash function, an encrypted passcode, a shared secret key, a checksum or cyclic redundancy check (CRC), a signature, or a Message Authentication Code (MAC).

9. A system for transmitting files to a remote vehicle, the system comprising:
a communication system at a ground unit;
at least one processor coupled to the communication system; and
at least one storage device comprising a database, the at least one storage device further comprising computer executable instructions which when executed by the at least one processor implement a process comprising:
obtaining a file for transmittal from the ground unit to a remote vehicle;
computing a first security file from the file for transmittal;
uplinking the file for transmittal to the remote vehicle;
receiving a downlinked second security file from the remote vehicle;
performing an integrity check based on the second security file;
when the integrity check confirms that the uplinked file as received by the remote vehicle is a copy of the file, uplinking an authentication message to the remote vehicle.

10. The system of claim 9, wherein the remote vehicle comprises an aircraft avionics
system onboard an aircraft.

11. The system of claim 9, wherein performing an integrity check includes
comparing the first security file with the second security file downlinked from the remote vehicle.

12. The system of claim 9, wherein the first security file comprises a message
authentication code, the instructions configured to implement a process comprising:
transmitting the message authentication code for the file for transmittal to the remote vehicle;
wherein receiving a downlinked second security file includes receiving an acknowledgement message authentication code;
wherein performing an integrity check includes analyzing the acknowledgement message authentication code.

13. The system of claim 9, further comprising transmitting uplink transmissions through one or more alternate communications channels.

14. The system of claim 9, wherein the first security file is computed using at least one of a hash function, an encrypted passcode, a shared secret key, a checksum or cyclic redundancy check (CRC), a signature, or a Message Authentication Code (MAC).

15. The system of claim 9, wherein the authentication message includes at least one of an encrypted passcode, a shared secret key, or a database letter.

* * * * *